(12) United States Patent
Kinoshita et al.

(10) Patent No.: US 7,090,250 B2
(45) Date of Patent: Aug. 15, 2006

(54) STEERING SYSTEM WITH TILT CONTROL

(75) Inventors: Satoshi Kinoshita, Aichi (JP);
Yoshiyuki Shimizu, Lyons (FR);
Kazuhiro Sugiyama, Kanagawa (JP);
Yoshiyuki Moriya, Kanagawa (JP);
Yota Uesaka, Aichi (JP)

(73) Assignee: Fuji Kiko Co., Ltd., Kosai (JP)

( * ) Notice: Subject to any disclaimer, the term of this patent is extended or adjusted under 35 U.S.C. 154(b) by 329 days.

(21) Appl. No.: 10/669,707

(22) Filed: Sep. 25, 2003

(65) Prior Publication Data

US 2004/0112165 A1   Jun. 17, 2004

(30) Foreign Application Priority Data

Sep. 25, 2002  (JP)  .............................. 2002-278455
Apr. 21, 2003  (JP)  .............................. 2003-115155

(51) Int. Cl.
*B62D 1/183* (2006.01)

(52) U.S. Cl. ......................................... 280/775; 74/493

(58) Field of Classification Search ................ 280/775; 74/493, 495; B62D 1/183
See application file for complete search history.

(56) References Cited

U.S. PATENT DOCUMENTS

| 4,033,158 | A | * | 7/1977 | Chamberlain et al. ......... 70/202 |
| 4,752,085 | A | * | 6/1988 | Yamamoto .................... 280/775 |
| 4,934,737 | A | * | 6/1990 | Nakatsuka .................... 280/775 |
| 4,978,137 | A | * | 12/1990 | Futami et al. ............... 280/775 |
| 5,088,766 | A | * | 2/1992 | Nakatsuka et al. .......... 280/775 |
| 5,485,376 | A | * | 1/1996 | Oike et al. .................... 701/41 |
| 2004/0245758 | A1 | * | 12/2004 | Sato et al. .................... 280/775 |

FOREIGN PATENT DOCUMENTS

| JP | 03028070 A | * | 2/1991 |
| JP | 6-249327 A | | 9/1994 |
| JP | 2000-71798 A | | 3/2000 |

* cited by examiner

*Primary Examiner*—Paul N. Dickson
*Assistant Examiner*—Laura B. Rosenberg
(74) *Attorney, Agent, or Firm*—Foley & Lardner LLP

(57) ABSTRACT

A steering system includes:
a tilt mechanism including a pivotal shaft which extends in a sidewise direction of the vehicle, the tilt mechanism being adapted to pivot the movable column portion upward and downward around the pivotal shaft, the tilt mechanism controlling the movable column portion to be secured in a certain upper pivotal position and a certain lower pivotal position;
a telescope mechanism adapted to pull out and push in in a forward-backward direction of the vehicle the movable column portion including the pivotal shaft;
a pop up mechanism for allowing the movable column portion to make a popping up over an uppermost pivotal position defined by the tilt mechanism; and
a pop up mechanism controlling mechanism for controlling the popping up of the movable column portion by the pop up mechanism until the movable column portion pulled out by the telescope mechanism has a certain length.

13 Claims, 10 Drawing Sheets

STEERING SYSTEM WITH TILT CONTROL

BACKGROUND OF THE INVENTION

1. Field of the Invention

The present invention relates to a steering system having a tilt mechanism and a pop up mechanism both for controlling tilting of a steering wheel, with some parts shared by the tilt mechanism and the pop up mechanism. Moreover, the steering system under the present invention includes a telescope mechanism for moving the steering wheel substantially in a forward-backward direction.

2. Description of the Related Art

For improving seat occupant's comfort (namely, getting in and getting off the vehicle with ease), various types of steering systems are proposed, including one that has a steering wheel capable of popping up to a certain position when the seat occupant gets off the vehicle and moving back to a driving position after the seat occupant gets in the vehicle.

Recently, another steering wheel having a greater popping up angle for further improving the seat occupant's comfort is in practical use, as is disclosed in Japanese Patent Unexamined Publication No. 2000-71798 (=JP2000071798).

A steering system according to Japanese Patent Unexamined Publication No. 2000-71798 (=JP2000071798) is mounted to a vehicle having an automatic transmission. When the vehicle is in an idle state or an ignition key is turned on, the steering wheel is allowed to pop up to an angle over an ordinary driving angle. The steering wheel includes a steering position selecting means, a steering position sensing means, a shift lever parking position sensing means, a foot brake pedal position sensing means, a steering moving means, a shift lever locking means, and a steering movement controlling means. The shift lever locking means locks (disables) shift selection. The steering movement controlling means controls the shift lever locking means and the steering movement controlling means by taking in a signal of each of the steering position selecting means, the steering position sensing means, the shift lever parking position sensing means and the foot brake pedal position sensing means.

The steering movement controlling means makes the following control:

With the steering wheel popped up, the seat occupant even stepping on a foot brake pedal cannot make a shift selection due to the shift lever locking means. Moreover, the seat occupant even stepping on the foot brake pedal cannot unlock the shift lever locking means unless the steering wheel is returned to a driving position completely.

On the other hand, the steering wheel returned to the driving position completely may allow the seat occupant to unlock the shift lever locking means by stepping on the foot brake pedal.

Summarizing the above, the seat occupant can unlock the shift lever locking means by stepping on the foot brake pedal only in a state of the steering wheel completely returned to the driving position. With the steering wheel in an inoperable position, the seat occupant stepping down the foot brake pedal cannot make the shift selection from parking to other speed range, even when the vehicle is in the idle state or the ignition key is turned on.

With the steering system according to Japanese Patent Unexamined Publication No. 2000-71798 (=JP2000071798), however, a pop up mechanism popping up the steering wheel greatly upward in the vehicle's stop and the like may cause an interference to a steering column's cover with an instrument panel which is disposed in front of the seat occupant in the vehicle.

BRIEF SUMMARY OF THE INVENTION

It is an object of the present invention to provide a steering system including a manual pop up mechanism and a manual telescope mechanism.

It is another object of the present invention to provide the steering system that is free from causing an interference to a steering column's cover with an instrument panel when a steering wheel is popped up, thus securing safety.

It is still another object of the present invention to provide the steering system that makes the following restrictions independent of each other for simplified control and assured operation:

1. Popping up restriction by telescope position.
2. Popping up restriction by driving state of a vehicle.

According to a first aspect of the present invention, there is provided a steering system for a vehicle. A steering column of the steering system is separated in a certain axial position into a stationary column portion on a steering gear side and a movable column portion on a steering wheel side opposite to the steering gear side. The steering system comprises:

1) a tilt mechanism including a pivotal shaft which is disposed at a portion substantially of the separation and extends substantially in a sidewise direction of the vehicle, the tilt mechanism being adapted to pivot the movable column portion substantially upward and downward around the pivotal shaft, the tilt mechanism controlling the movable column portion to be secured in a certain upper pivotal position and a certain lower pivotal position for a driving of the vehicle;

2) a telescope mechanism adapted to pull out and push in substantially in a forward-backward direction of the vehicle the movable column portion including the pivotal shaft;

3) a pop up mechanism for allowing the movable column portion to make a popping up over substantially an uppermost pivotal position defined by the tilt mechanism; and 4) a pop up mechanism controlling mechanism for controlling the popping up of the movable column portion by the pop up mechanism until the movable column portion pulled out by the telescope mechanism has a certain length.

According to a second aspect of the present invention, there is provided a steering system. A telescope jacket is telescopically mounted to a stationary column portion. A hinge bracket is mounted to a free end portion of the telescope jacket. A movable column portion is pivotally mounted to the hinge bracket via a pivotal shaft. The telescopic jacket in a telescopic position thereof substantially in an axial direction is adjustable relative to the stationary column portion. The movable column portion in an angular position thereof substantially in an upward-downward direction is adjustable relative to the hinge bracket. A lock mechanism is provided for a locking operation and an unlocking operation in the telescopic position and the angular position. The movable column portion is adapted to make a popping up over a certain angle range for a tilting. The steering system comprises:

1) a control portion defining a track, comprising;
   i) a base end portion fixed to the stationary column portion, and ii) a head end portion which is a free end portion extending substantially in parallel to the telescope jacket, 2) a stopper plate fixed to the movable column portion, the stopper plate being pivotal around a pivotal shaft substantially integrally with the movable column portion, the stopper plate defining a track, and 3) an engagement portion pivotally supported to the hinge bracket, the engagement portion being biased to a direction for engaging with the stopper plate, the engagement portion including a first end portion and a second end portion.

With the second end portion on the track defined by the stopper plate, the first end portion is away from the track defined by the control portion.

With the second end portion away from the track defined by the stopper plate, the first end portion is on the track defined by the control portion.

With the telescope jacket in a position for becoming shorter than a certain length thereof, the control portion abuts on the first end portion of the engagement portion, thus stopping the second end portion of the engagement portion from being away from the track defined by the stopper plate.

With the movable column portion in a position for making the popping up, the stopper plate abuts on the second end portion of the engagement portion, thus preventing the first end portion of the engagement portion from being away from the track defined by the control portion.

The other object(s) and feature(s) of the present invention will become understood from the following description with reference to the accompanying drawings.

DETAILED DESCRIPTION OF THE EMBODIMENT

In the following, various embodiments of the present invention will be described in detail with reference to the accompanying drawings.

For ease of understanding, the following description will contain various directional terms, such as, left, right, upper, lower, forward, backward and the like. However, such terms are to be understood with respect to only a drawing or drawings on which the corresponding part of element is illustrated.

Figure 1:
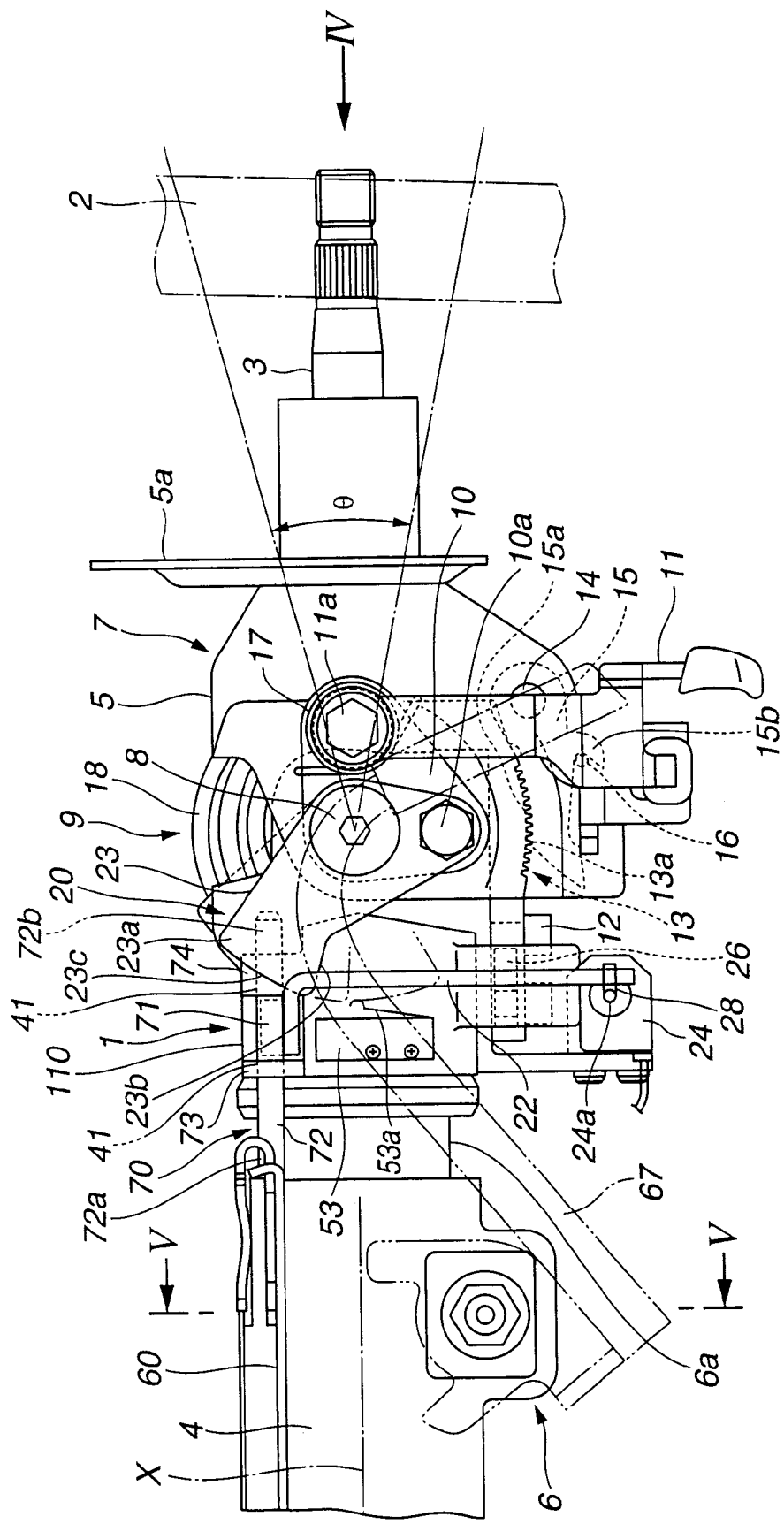
FIG. 1 is a partly broken side view of a steering system, according to a first embodiment of the present invention.
Figure 2:
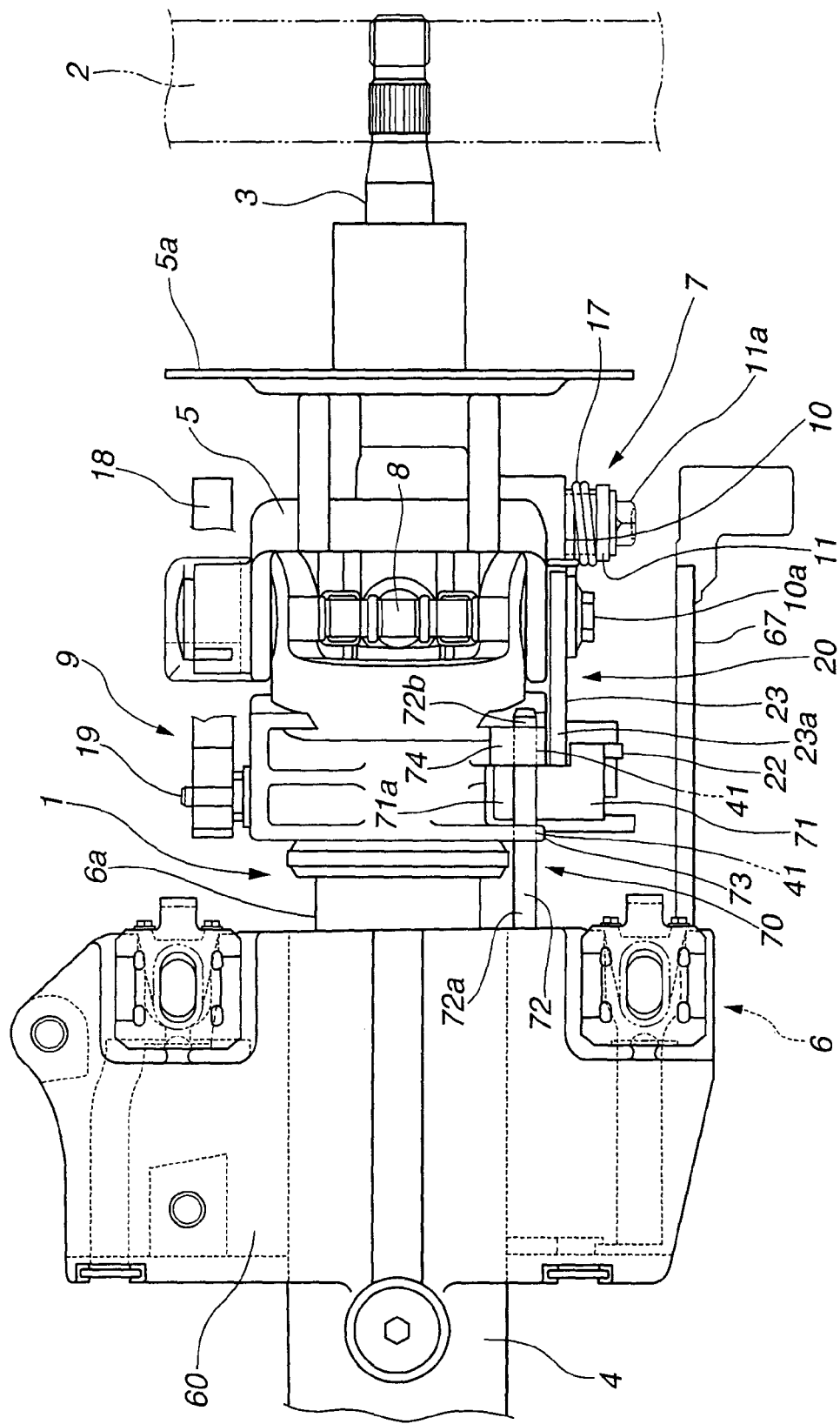
FIG. 2 is a plan view of the steering system, according to the first embodiment.
Figure 3:
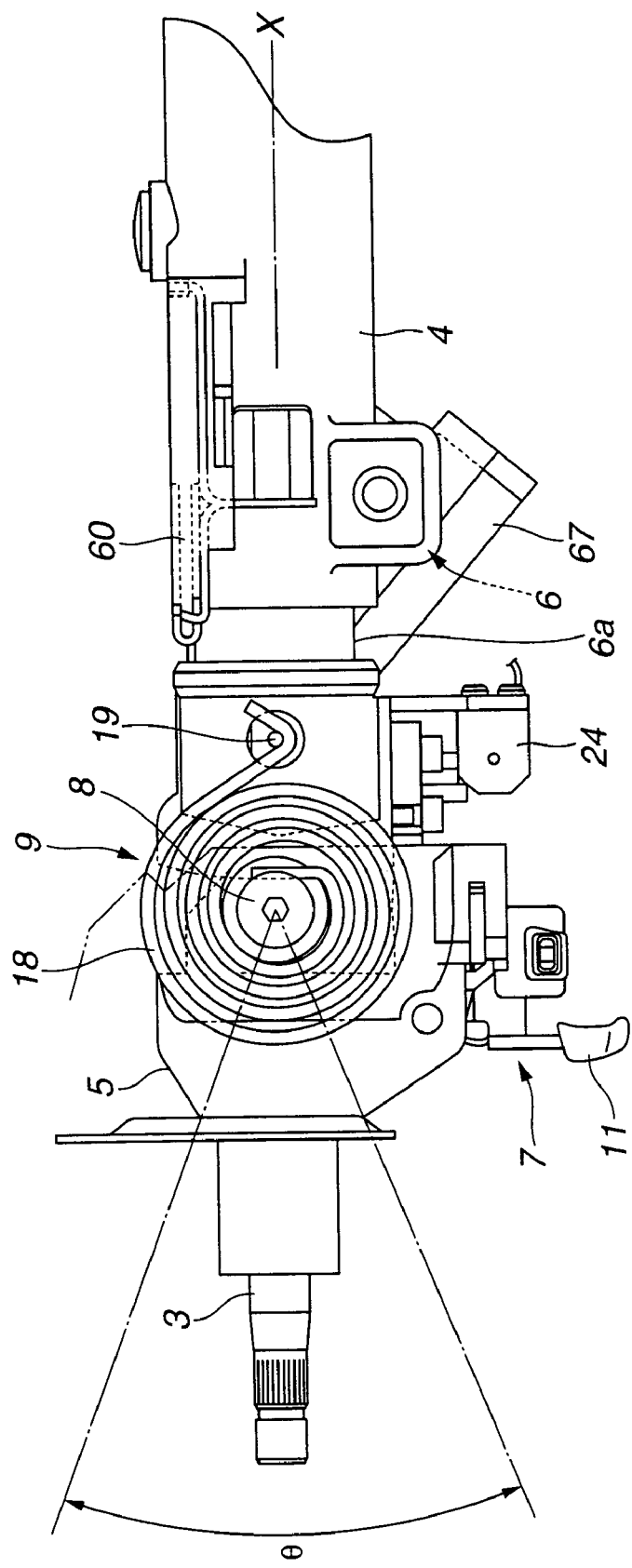
FIG. 3 is a side view of the steering system, according to the first embodiment.

FIG. 1 to FIG. 3 show a steering system applied to a vehicle equipped with an automatic transmission, according to a first embodiment of the present invention.

The steering system includes a steering column 1, an upper shaft 3, and a lower shaft (not shown). The steering column 1 supports a steering wheel 2 to a vehicular body. The upper shaft 3 is inserted into a first end (right in FIG. 1 and FIG. 2) of the steering column 1, and has an upper end (right in FIG. 1 and FIG. 2) which is exposed outward and fitted with the steering wheel 2. The lower shaft (not shown) has an upper end connected with a lower end (left in FIG. 1 and FIG. 2) of the upper shaft 3 via a first universal joint (not shown), and a lower end connected with a steering gear (not shown) via a second universal joint.

The steering column 1 is separated into a stationary column portion 4 on the steering gear (not shown)'s side and a movable column portion 5 on the steering wheel 2's side.

The stationary column portion 4 is shaped substantially into a column. The stationary column portion 4 has an upper end (on the steering wheel 2's side) bolted to the vehicular body via the upper clamp 60, and a lower end bolted to the vehicular body via a lower clamp (not shown).

The movable column portion 5 disposed on the steering wheel 2' side is shaped abnormal (or deformed), having a flange portion 5a fitted with a combination switch (not shown). The movable column portion 5 is so supported as to pivot around a tilt hinge shaft 8 substantially upward-downward relative to the stationary column portion 4, where the tilt hinge shaft 8 (pivotal shaft) is disposed substantially sidewise in FIG. 2. Moreover, a telescope mechanism 6 may allow the movable column portion 5 to move substantially forward-backward together with the tilt hinge shaft 8.

Figure 5:
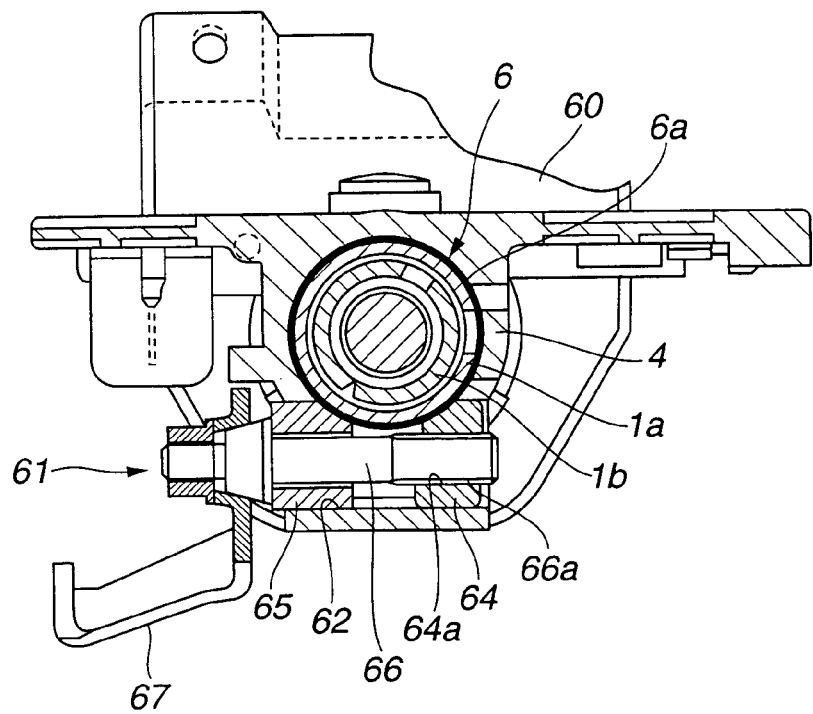
FIG. 5 is a cross section taken along lines V—V in FIG. 1, according to the first embodiment.

As is seen in FIG. 1, FIG. 2 and FIG. 5, the telescope mechanism 6 has an outer tube 1a, an inner tube 1b and a controller-releaser 61. The outer tuber 1a is fixed in the stationary column portion 4. The inner tube 1b is slidably inserted into the outer tube 1a, to be connected with the movable column portion 5. With respective pressurization and depressurization of the outer tube 1a, the controller-releaser 61 may control and release the inner tube 1b.

As is seen in FIG. 5, below the stationary column portion 4, there is defined a sliding hole 62 extending substantially sidewise in the vehicular body. Moreover, the controller-releaser 61 has a pair of a first block 64 and a second block 65, an operation shaft 66, and a telescope lever 67.

The pair of the first block 64 and the second block 65 are disposed in the sliding hole 62 in such a manner as to slide closer to each other or spaced apart from each other. Sliding closer to each other, the pair of the first block 64 and the second block 65 may pressurize a lower end portion of an outer periphery of the outer tube 1*a*.

The operation shaft 66 inserted into each of the first block 64 and the second block 65 has a first end (right in FIG. 5) an outer periphery of which is formed with a male screw 66*a* screwed into a female screw 64*a* of the first block 64.

The telescope lever 67 is connected with a second end (left in FIG. 5) of the operation shaft 66. A second end side (left in FIG. 5) of the operation shaft 66 is inserted into the second block 65 with play.

Turning the telescope lever 67 counterclockwise in FIG. 1 may turn the operation shaft 66 in such a manner as to allow the first block 64 and the second block 65 to come closer to each other via the female screw 64*a* and the male screw 66*a*. A pair of inclined faces of the first block 64 and the second block 65 may pressurize the lower end portion of the outer periphery of the outer tube 1*a*, thus causing a friction between the outer tube 1*a* and the inner tube 1*b* and thereby controlling (restricting) the forward-backward movement of the inner tube 1*b*.

Contrary to the above operation, turning the telescope lever 67 clockwise in FIG. 1 from the above state may turn the operation shaft 66 in such a manner as to allow the first block 64 and the second block 65 to become spaced apart from each other via the female screw 64*a* and the male screw 66*a*, thus depressurizing the lower end portion of the outer periphery of the outer tube 1*a* and thereby allowing the forward-backward sliding of the inner tube 1*b*.

Figure 6:
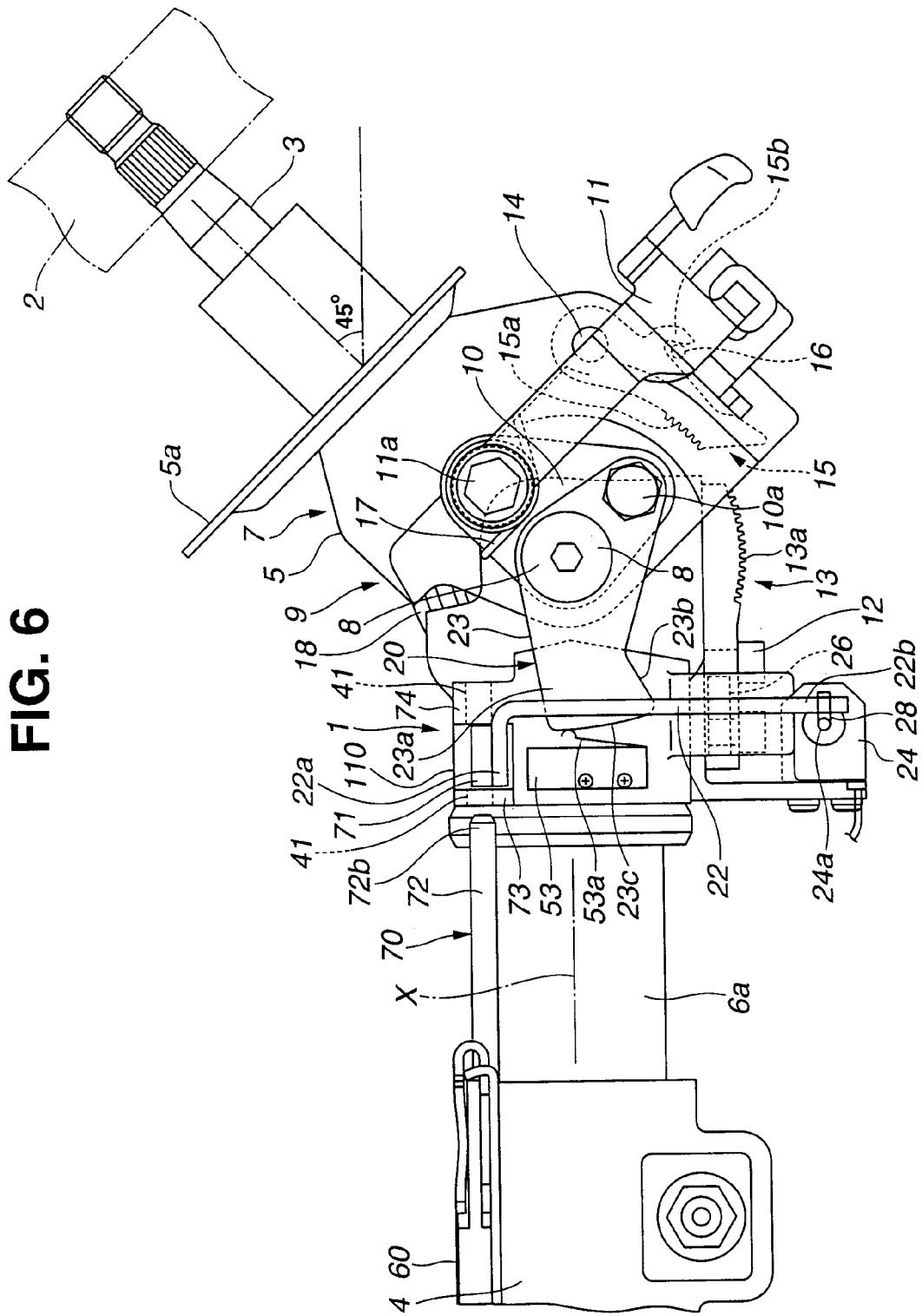
FIG. 6 is similar to FIG. 1 but showing the steering system in a maximum popped up state, according to the first embodiment.

As is seen in FIG. 1, the movable column portion 5 may be tilted within a certain angle range θ (about 10° and about 15° upward and downward, relative to a certain axial line X of the stationary column portion 4) by means of a tilt mechanism 7. Moreover, the movable column portion 5 can be popped up by a pop up mechanism 9 over the certain angle range θ given by the tilt mechanism 7. More specifically, the above popping up angle is about 45° (maximum) upward from the certain axial line X of the stationary column portion 4, as is seen in FIG. 6.

As is seen in FIG. 1 to FIG. 3, the tilt mechanism 7 includes the tilt hinge shaft 8, a tilt lever 11, a stationary side tooth member 13, and a movable side tooth member 15.

The tilt hinge shaft 8 supports the movable column portion 5. The tilt lever 11 is mounted to an end of a mounting face 10 via a lever bolt 11*a* in such a manner as to pivot substantially forward and backward. Hereinabove, the mounting face 10 is formed on a first side (lower in FIG. 2) of the movable column portion 5 and is shaped substantially into a rounded triangle (see FIG. 6).

The stationary side tooth member 13 in FIG. 1 is fixed by means of a bolt 12 to a lower end (on the movable column portion 5' side) of the stationary column portion 4. The stationary side tooth member 13 has a lower end formed with a plurality of tooth portions 13*a* shaped substantially into a convex arc.

At a lower end of the movable column portion 5, the movable side tooth member 15 in FIG. 1 is pivotal around a pivotal shaft 14. The movable side tooth member 15 is formed with a plurality of tooth portions 15*a* shaped substantially into a concave arc. The tooth portions 15*a* may mesh with and released from the tooth portions 13*a*.

The tilt lever 11 has a lower inner face which is formed with a releasing protrusion 16, as is seen in FIG. 1. Moving the movable side tooth member 15 downward, the releasing protrusion 16 may release the tooth portions 15*a* from the tooth portions 13*a*. Moreover, the tilt lever 11 is biased clockwise in FIG. 1 by means of a lever spring 17 which is a torsional coil spring winding at a head portion of the lever bolt 11*a*. In this state, the lever spring 17 may push the movable side tooth member 15 in a direction for meshing the tooth portions 15*a* with the tooth portions 13*a*.

As is seen in FIG. 1 and FIG. 6, the pop up mechanism 9 basically shares members with the tilt mechanism 7, including the tilt hinge shaft 8, the tilt lever 11, the stationary side tooth member 13, the movable side tooth member 15 and the like.

Other than the above shared members, the pop up mechanism 9 has a spiral spring 18 windingly disposed on the second side (upper in FIG. 2) of the movable column portion 5, as is seen in FIG. 5 and FIG. 6. The spiral spring 18 (biasing member) may bias the movable column portion 5 upward (popping up direction). More specially, FIG. 6 shows the movable column portion 5 adapted to popped up by means of the spiral spring 18 about 45° relative to the certain axial line X of the stationary column portion 4, with the movable side tooth member 15 completely released from the stationary side tooth member 13. As is seen in FIG. 2, the spiral spring 18 has an outer end portion engaging with a supporter pin 19 protruding from a second side (upper in FIG. 2) of the stationary column portion 4, and an inner end portion engaging with the second side (upper in FIG. 2) of the movable column portion 5.

The pop up mechanism 9 has an operation controller 20 for controlling and releasing the pivoting of the movable side tooth member 15, based on determination whether or not a shift lever 40 (to be described afterward referring to FIG. 7) is in a P-range (stoppage of the vehicle).

Figure 4:
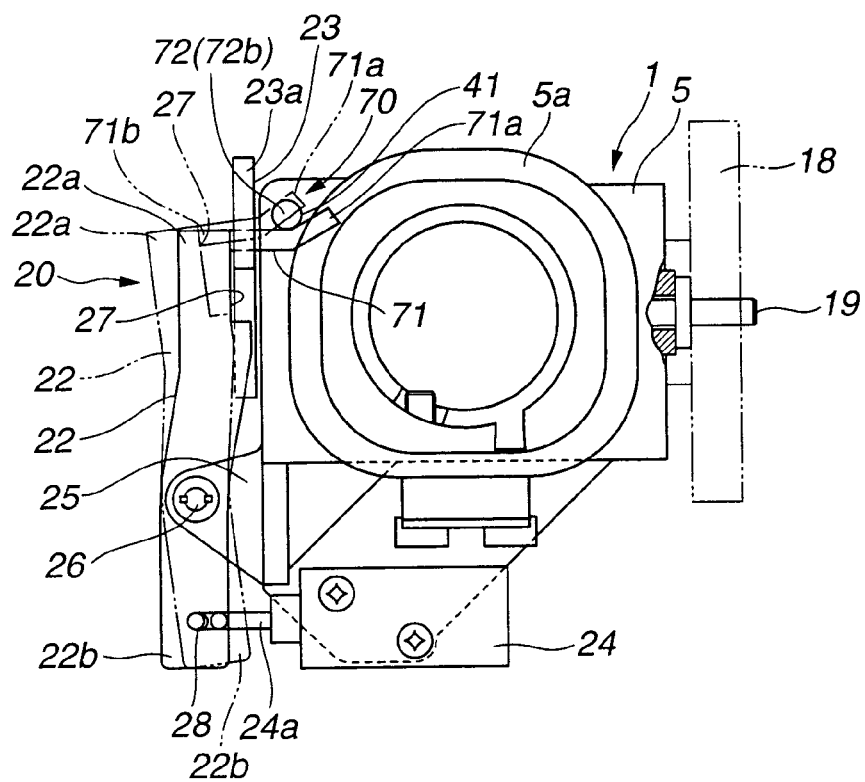
FIG. 4 shows a view viewed in a direction indicated by an arrow IV in FIG. 1, according to the first embodiment.

More specifically, as is seen in FIG. 1, FIG. 2 and FIG. 4, the operation controller 20 is constituted basically of mechanical and electrical members including a lock plate 22, a stopper plate 23, and an electromagnetic actuator 24.

The lock plate 22 is a lock member which is disposed in the vicinity of the stationary side tooth member 13 of the stationary column portion 4 in such a manner as to pivot substantially in the sidewise direction of the vehicle. The stopper plate 23 is fixed via a bolt 10*a* to the mounting face 10 of the movable column portion 5, and is an operation member engaging with the lock plate 22 and disengaging from the lock plate 22. The electromagnetic actuator 24 extends substantially in the sidewise direction of the vehicle, and is fixed to a lower portion of the stationary column portion 4 via a bracket. Based on a sensing signal from a P-range sensing switch 52 (to be described afterward referring to FIG. 8), the electromagnetic actuator 24 may pivot the lock plate 22 for engagement (with the stopper plate 23) and disengagement (from the stopper plate 23).

As is seen in FIG. 1 and FIG. 4, the lock plate 22 shaped substantially into an elongated rectangle extends upward and downward. A substantially middle portion of the lock plate 22 is so disposed as to pivot substantially in the sidewise direction of the vehicle around a pivotal shaft 26 which is supported by a supporter bracket 25 protruding from a first side (lower in FIG. 2) of the stationary column portion 4. The lock plate 22 defines a first end portion 22*a* (upper) having an inside (right in FIG. 4) which is formed with an engagement groove 27 shaped substantially into a rectangle. A wall of the engagement groove 27 may engage with an upper end portion 23*a* of the stopper plate 23. The lock plate 22 defines a second end portion 22*b* (lower) formed with a hole (not numbered) engaging with a head end portion 28 (shaped substantially into an English alphabet L) of the driving shaft 24*a* of the electromagnetic actuator 24.

As is seen in FIG. 1, the stopper plate 23 is shaped substantially into a bold English alphabet L (or a boot). The stopper plate 23 has a lower end portion which is fixed to the mounting face 10 via a bolt 10a, and a middle portion which is fixed to the tilt hinge shaft 8. The stopper plate 23 may pivot substantially in the upward-downward direction of the vehicle integrally with the movable column portion 5. The upper end portion 23a of the stopper plate 23 is shaped substantially into a sector. Moreover, a lower edge 23b (substantially flat) of the stopper plate 23 is engageable with the wall of the engagement groove 27 of the lock plate 22, while a head edge 23c of the stopper plate 23 is shaped substantially into an arc in such a manner as to be adapted to abut on a pop up sensing switch 53 (to be described afterward).

The pop up sensing switch 53 is disposed at a front end portion (right in FIG. 1) of the stationary column portion 4. Ordinarily, the pop up sensing switch 53 is turned on. The head edge 23c pressing a switch piece 53a may turn off the pop up sensing switch 53, thus cutting off the sensing signal of a brake pedal switch 54 (to be described afterward).

The electromagnetic actuator 24 is of what is called a solenoid type and incorporates therein a coil and a solenoid spring.

With the incorporated coil deenergized, the incorporated solenoid spring may bias the driving shaft 24a in a direction of protrusion (leftward in FIG. 4), thus engaging the upper end portion 23a of the stopper plate 23 with the wall of the engagement groove 27 of the lock plate 22. In this state, further pivotal movement pivotal movement (counterclockwise in FIG. 1) of the stopper plate 23 can be controlled (restricted).

Figure 7:
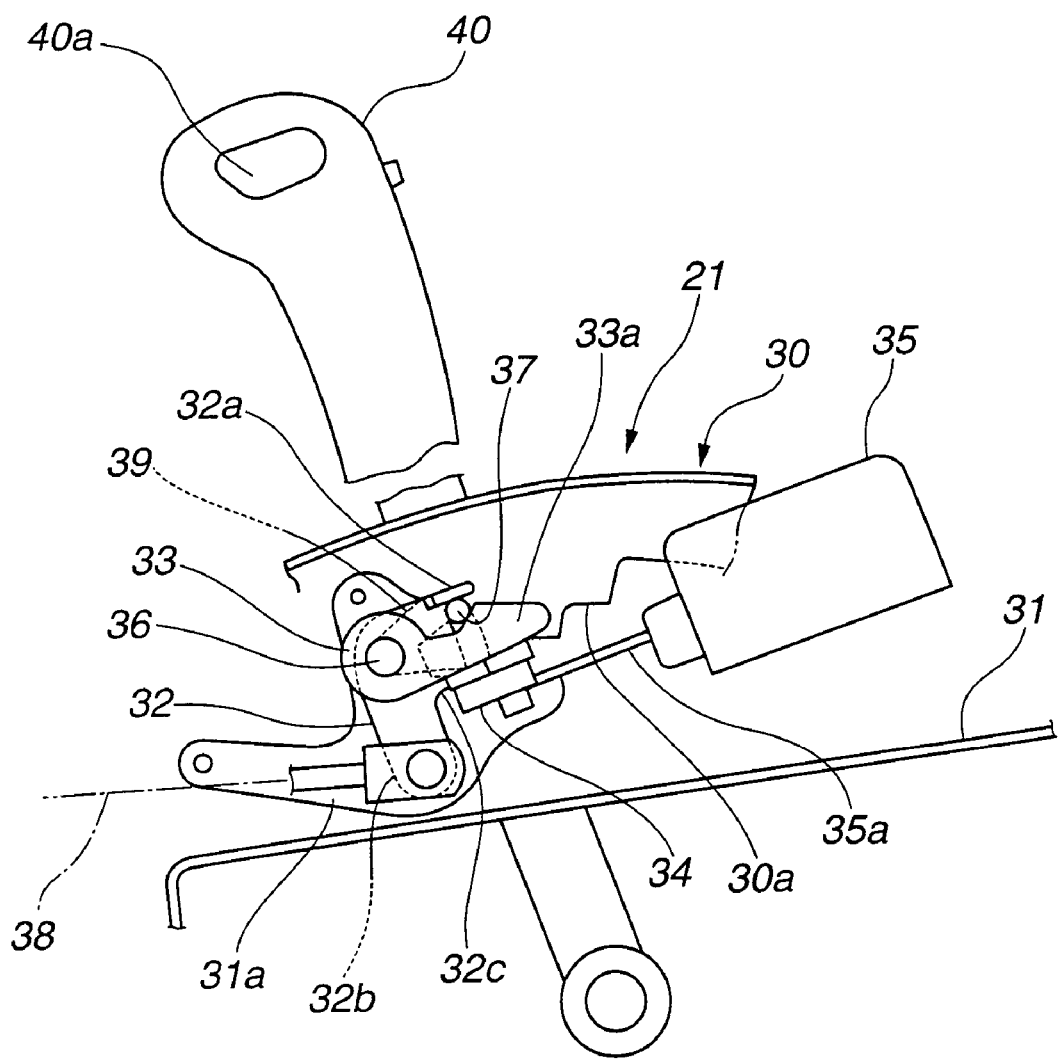
FIG. 7 is a schematic of a shift lock mechanism, under the present invention.

With the incorporated coil energized, an electromagnetic absorption may move the driving shaft 24a backward (rightward in FIG. 4), thus disengaging the stopper plate 23 from the lock plate 22. The electromagnetic actuator 24 can be energized with an ON signal (indicating the shift lever 40 in the P-range) from the P-range sensing switch 52 (FIG. 8) of the shift lever 40 (FIG. 7).

The pop up mechanism 9 is interlocked with a pop up mechanism controlling mechanism 70 which makes the following control:

Until the telescope mechanism 6 pulls out the movable column portion 5 to a certain extent (in this case, a maximum pulled-out length), the popping up of the movable column portion 5 over the certain angle range θ is controlled (restricted).

The pop up mechanism 9 is also interlocked with a shift lock mechanism 21 which makes the following control:

When the popping up of the movable column portion 5 is over the certain angle range θ, the shift lever 40 is controlled (restricted) from moving to other speed range(s) than the P-range.

As is seen in FIG. 1 and FIG. 2, the pop up mechanism controlling mechanism 70 includes an engagement portion 71 and a control portion 72. The engagement portion 71 at an upper end of the lock plate 22 extends substantially in the sidewise direction of the vehicle and is shaped substantially into a plate. From an end (of the movable column portion 5's side) of the stationary column portion 4, the control portion 72 extends substantially in the forward-backward direction of the vehicle. The control portion 72 is adapted to engage with the engagement portion 71 and is shaped substantially into a round rod with a small diameter.

As is seen in FIG. 4, the engagement portion 71 is so bent as to form substantially a flat portion extending substantially horizontally (see actual line of the engagement portion 71) from the first end portion 22a of the lock plate 22 toward the stopper plate 23. The engagement portion 71 has a first end portion 71a (right in FIG. 4) which is so bent as to incline upward.

As is seen in FIG. 2, a base end portion 72a of the control portion 72 is fixed to an end portion of the stationary column portion 4, while a head end portion 72b of the control portion 72 is slidably inserted into a guide hole 41 of each of a pair of a first guide 73 (forward) and a second guide 74 (backward). Hereinabove, the lock plate 22 is put between the first guide 73 and the second guide 74 on a first side (lower in FIG. 2) of the movable column portion 5.

As is seen in FIG. 4, the head end portion 72b defines a lower face which is adapted to abut on an upper face (actual line in FIG. 4) of the first end portion 71a of the engagement portion 71, thus keeping the lock plate 22 engaged with the stopper plate 23.

The control portion 72 makes the following control:

With the control portion 72 pulled out to its maximum in length (maximum pulled-out position) by pulling movable column portion 5 with the telescope mechanism 6, the head end portion 72b may be disengaged from the guide hole 41 of each of the first guide 73 and the second guide 74, thus disengaging the lower face of the head end portion 72b from the upper face of the first end portion 71a.

Hereinabove, the head end portion 72b is so tapered (see FIG. 1 or FIG. 6) as to prevent a head-on collision on a peripheral wall of the guide hole 41 of each of the first guide 73 and the second guide 74 or on the upper face of the first end portion 71a of the engagement portion 71.

The entire contents of Japanese Patent Unexamined Publication No. Heisei 6 (1994)-249327 (=JP6249327, applicant: Fujikiko, same as the applicant of the present invention) is herein incorporated by reference, disclosing a shift lock mechanism. The shift lock mechanism 21 according to the present invention is substantially like the one disclosed in the above publication.

FIG. 7 shows a schematic of the shift lock mechanism 21 which is united with a position plate 30 of a bracket 31. The shift lever 40 is securely inserted into the bracket 31. The shift lock mechanism 21 includes a first operation member 32, a second operation member 33, a lock member 34, an electromagnet driving portion 35, and a unit base 31a.

The first operation member 32 is shaped substantially into a bell crank, and has a base section which is pivotally supported by the unit base 31a via a pivotal shaft 36. The first operation member 32 defines a first arm portion 32a extending on a position pin 37's side. The first arm portion 32a has a lower face which is disposed in a position for abutting on the position pin 37 with the shift lever 40 in the P-range. The first operation member 32 defines a second arm portion 32b having a head end which is connected with a first end of a key lock cable 38 interlocked with a key interlock mechanism (not shown).

The second operation member 33 has a base section which is pivotally supported by the bracket 31 via the pivotal shaft 36 substantially coaxial with the first operation member 32. The second operation member 33 defines an arm portion 33a extending from the base section thereof to the position pin 37's side. The arm portion 33a facing the first arm portion 32a of the first operation member 32 is disposed at a lower part of the first arm portion 32a. Moreover, the arm portion 33a is formed with a protrusion protruding to the lock member 34's side.

The first arm portion 32a of the first operation member 32 and the arm portion 33a of the second operation member 33 are so biased by a torsional coil spring 39 (wound around the pivotal shaft 36) as to be pulled to each other, thus pressingly sandwiching the position pin 37 in the P-range position.

The lock member 34 shaped substantially into a bell crank has a base section which is pivotally supported to the bracket 31 via a pivotal shaft substantially orthogonal to the pivotal shaft 36. The lock member 34 has a first arm portion (not shown) formed with an elongated hole (not shown) with which a hook portion (not shown) of a plunger 35a of an electromagnetic driving portion 35 (to be described afterward) engages. With the shift lever 40 in the P-range in accordance with rotation of the lock member 34, a second arm portion (not shown) of the lock member 34 moves to a position facing a lower face of the protrusion (not shown in FIG. 7) of the second operation member 33. Moreover, the first operation member 32 facing the second arm portion (not shown) of the lock member 34 is formed with a protrusion 32c.

Shifting the shift lever 40 from a driving range toward the P-range with a knob button 40a pressed may allow the position pin 37 to abut on an upper face of the arm portion 33a of the second operation member 33. Thereafter, further shifting the shift lever 40 to the P-range may allow the position pin 37 to move below a "P" of the P-range, with the arm portion 33a of the second operation member 33 pressed downward against a biasing force of the torsional coil spring 39.

Thereafter, the shift lever may reach the P-range, thus allowing the first arm portion 32a of the first operation member 32 and the arm portion 33a of the second operation member 33 to pressingly sandwich the position pin 37.

Herein, releasing the knob button 40a may allow the position pin 37 to engage with an upper end of a P-range groove 30a by means of a compression spring. Substantially simultaneously with this, the position pin 37 of the shift lever 40 may turn on the P-range sensing switch 52 (microswitch) in FIG. 8, thus exciting the electromagnetic driving portion 35 (solenoid) via a controller 50 and further thus pulling in the plunger 35a. With this, the lock member 34 may turn clockwise in FIG. 7 and have its arm portion to move to a position facing a lower face of the protrusion (not shown) of the second operation member 33, thus locking the shift lever 40 to the P-range. Moreover, the lock member 34 is kept in a lock position by abutting on the protrusion 32c of the first operation member 32.

Figure 8:
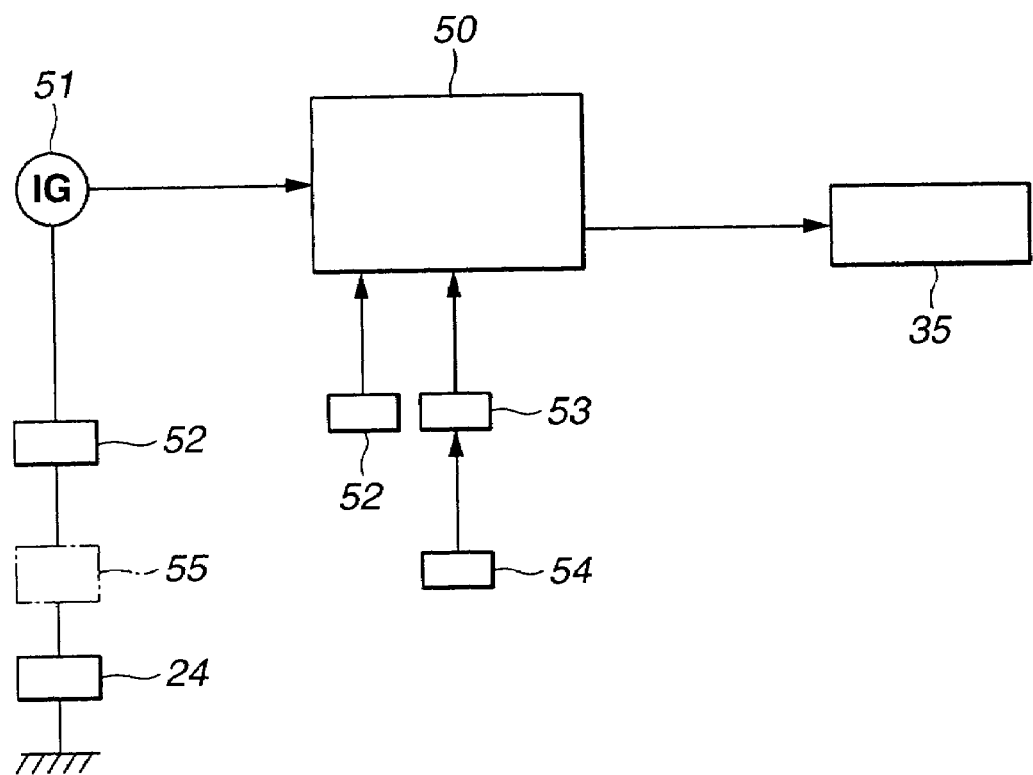
FIG. 8 is a control block diagram, according to the first embodiment.

Hereinafter described referring to FIG. 8 is a control block of the pop up mechanism 9 and the shift lock mechanism 21.

The controller 50 may make the following control:
With the P-range sensing switch 52 turned on, the controller 50 may excite the electromagnetic driving portion 35 (solenoid). Turning on a brake pedal switch 54 in this state may release the excitation of the electromagnetic driving portion 35.

According to the first embodiment, the shift lock mechanism 21 makes an energization locking operation, namely, exciting the electromagnetic driving portion 35 moves the lock member 34 to the lock position.

Contrary to the above, another shift lock mechanism may make an energization unlocking operation, namely, exciting the electromagnetic driving portion 35 moves the lock member 34 to the unlock position. The another shift lock mechanism is so controlled as to excite the electromagnetic driving portion 35 with both the P-range sensing switch 52 and the brake pedal switch 54 turned on.

As is seen in FIG. 8, turning on an ignition key switch 51 may supply a power to the controller 50 for operation. Receiving a sensing signal from each of the P-range sensing switch 52 and the brake pedal switch 54, the controller 50 may control the electromagnetic driving portion 35 (solenoid). In the pop up mechanism 9, while the P-range sensing switch 52 is turned on, control current is outputted to the electromagnetic actuator 24 for excitation, thus pivoting the lock plate 22 for disengagement from the stopper plate 23.

Herein, allowing the movable column portion 5 to move upward over the certain angle range θ by means of the tilt lever 11 may press the pop up sensing switch 53. The pop up sensing switch 53 disposed between the brake pedal switch 54 and the controller 50 (see FIG. 8) is ordinarily turned on. Pressing the switch piece 53a may turn off the pop up sensing switch 53.

In other words, with the pop up sensing switch 53 turned off, turning on the brake pedal switch 54 by stepping on the brake pedal cannot convey the sensing signal of the brake pedal switch 54 to the controller 50.

More specifically about this: With the movable column portion 5 popped up, the head edge 23c of the stopper plate 23 may so press the pop up sensing switch 53 as to as to turn off the pop up sensing switch 53 (from turned on state). With the thus obtained turned off state of the pop up sensing switch 53, the sensing signal of the brake pedal switch 54 may not be outputted to the controller 50. The controller 50, thereby, may make such a control as to demagnetize (deenergize) the electromagnetic driving portion 35 of the shift lock mechanism 21 even when the brake pedal switch 54 is turned on with the brake pedal stepped on. With this, the shift lock mechanism 21 controls (prevents) movement of the shift lever 40 from the P-range to other speed range(s).

In other words, the controller 50 may control the shift lever 40 to the P-range when the pop up sensing switch 53 is turned off. Herein, the state of the pop up sensing switch 53 turned off is a priority for the controller 50.

According to the first embodiment, with the shift lever 40 in the speed range(s) other than the P-range, for example, in a D-range for the vehicle's driving state, the movable column portion 5 is disposed in a proper driving position, thus turning on the pop up sensing switch 53 and turning off the P-range sensing switch 52. In this state, the spring force of the solenoid spring may allow the driving shaft 24a to protrude, thus pivoting the lock plate 22 clockwise, as is depicted by the actual line in FIG. 4. With this, the upper end portion 23a of the stopper plate 23 may engage with the engagement groove 27 of the lock plate 22, thus controlling (preventing) the movable column portion 5 from moving upward over the certain angle range θ. Thereby, operating the tilt lever 11 may pivot the movable column portion 5 within the certain angle range θ.

The shift lever 40 in the P-range (namely, when the vehicle is not running) may turn on the P-range sensing switch 52, thus energizing the electromagnetic driving portion 35 and further thus locking the shift lever 40. Stepping on the brake pedal (not shown) in this state may turn on the brake pedal switch 54, thus releasing control by the shift lock mechanism 21 and thereby allowing free movement of the shift lever 40.

As described above, stopping the vehicle and thereby turning on the P-range sensing switch 52, the seat occupant may thereafter push out the telescope lever 67 of the telescope mechanism 6 clockwise in FIG. 1, thus releasing the inner tube 1b from the outer tube 1a. Then, holding the steering column 2, the seat occupant pulling out the movable column portion 5 toward the seat occupant to a maximum extent (maximum pulled-out position) may allow the control portion 72 of the pop up mechanism controlling mechanism 70 to slide in the guide hole 41 of each of the first guide 73 and the second guide 74, thus disengaging the control portion 72 from the first end portion 71a of the engagement portion 71.

With the P-range sensing switch 52 turned on, thereafter, the controller 50 may energize the electromagnetic actuator 24, thus pulling in the second end portion 22b (lower) of the lock plate 22 and further thus keeping the lock plate 22, as is depicted by two-dot chain line in FIG. 4. With this, the upper end portion 23a of the stopper plate 23 may be disengaged from the engagement groove 27. In this state, operating the tilt lever 11 for disengaging the movable side tooth member 15 from the stationary side tooth member 13 may allow the movable column portion 5 to be pivotable to the upper limit of 45° by means of the spring force of the spiral spring 18, as is seen in FIG. 6.

In this case, together with the tilt hinge shaft 8, the movable column portion 5 is pulled to its maximum (maximum pulled-out position) toward the seat occupant, namely, the pop up position is sufficiently spaced apart from the instrument panel, thus assuredly preventing the movable column portion 5's cover from interfering with the instrument panel.

Moreover, the movable column portion 5 pivoting to the uppermost position may allow the upper end portion 23a of the stopper plate 23 to turn off the pop up sensing switch 53, thus controlling the shift lever 40 to be locked in the P-range by means of the shift lock mechanism 21.

Since the pop up sensing switch 53 is kept turned off, stepping on the brake pedal in this state cannot unlock the locking of the shift lever 40 by means of the shift lock mechanism 21, thus keeping the shift lever 40 in the P-range.

Thereby, driving the vehicle with the steering wheel 2 popped up by means of the pop up mechanism 9 can be assuredly prevented, thus improving safety in this respect.

On the other hand, the head end portion 72b of the control portion 72 may be kept abutting on the upper face of the first end portion 71a of the engagement portion 71 in the following states:
  the P-range sensing switch 52 is turned on, and the telescope mechanism 6 does not pull out the movable column portion 5 at all, or
  the P-range sensing switch 52 is turned on, and the telescope mechanism 6 pulls out the movable column portion 5 to a certain extent, instead of to the maximum pulled-out position.

With this, the first end portion 22a of the lock plate 22 may be controlled (prevented) from moving outward (leftward in FIG. 4), thus controlling (restricting) the pivotal movement of the stopper plate 23. Thereby, the movable column portion 5 (steering wheel 2) may be pivotable within the certain angle range θ (about 10° to about 15° upward and downward), preventing the great popping up by means of the pop up mechanism 9.

As a result, the movable column portion 5's cover can be prevented from interfering with the instrument panel when the movable column portion 5 is not sufficiently pulled out.

As described above, when the vehicle is driving, the lock plate 22 engages with the stopper plate 23, with the electromagnetic actuator 24 deenergized. With this, even careless operation of the tilt lever 11 during driving can assuredly prevent the steering wheel 2 from being popped up.

The first embodiment of the present invention can be summarized as below. When the vehicle is driving, an unexpected popping up of the steering wheel 2 can be prevented. With the movable column portion 5 not pulled out to its maximum (maximum pulled-out position), the steering wheel 2 makes the tilting within the certain angle range θ even when the vehicle is making a stop and the shift lever 40 is in the P-range. In other words, in this state, the steering wheel 2 cannot make the popping up by means of the pop up mechanism 9. The above leads to an improvement of safety and prevention of interference of the movable column portion 5's cover with the instrument panel, and prevention of any potential cracks and the like.

Moreover, when the movable column portion 5 is in a state of making the popping up, the first end portion 71a of the engagement portion 71 blocks the guide hole 41 defined substantially through a hinge bracket 110 which is mounted to a free end portion of a telescope jacket 6a telescopically mounted to the stationary column portion 4, thus preventing the head end portion 72b of the control portion 72 from entering the guide hole 41.

According to the first embodiment of the present invention, 1) the conventional manual tilt mechanism and the conventional manual shift lock mechanism of the shift lever can be used, and 2) by adding a simple constitution, the tilt mechanism and the pop up mechanism can be used in common without causing malfunction, resulting in reduction of the number of parts, facilitated production and low production cost.

Moreover according to the first embodiment, the pop up mechanism controlling mechanism 70 has a simple mechanical constitution, including the engagement portion 71 and the control portion 72, thus facilitating the production and assembly. Moreover, with the pop up mechanism controlling mechanism 70 interlocked with the telescope mechanism 6, controlling and releasing (by means of the pop up mechanism controlling mechanism 70) are free from any special skills.

Figure 9:
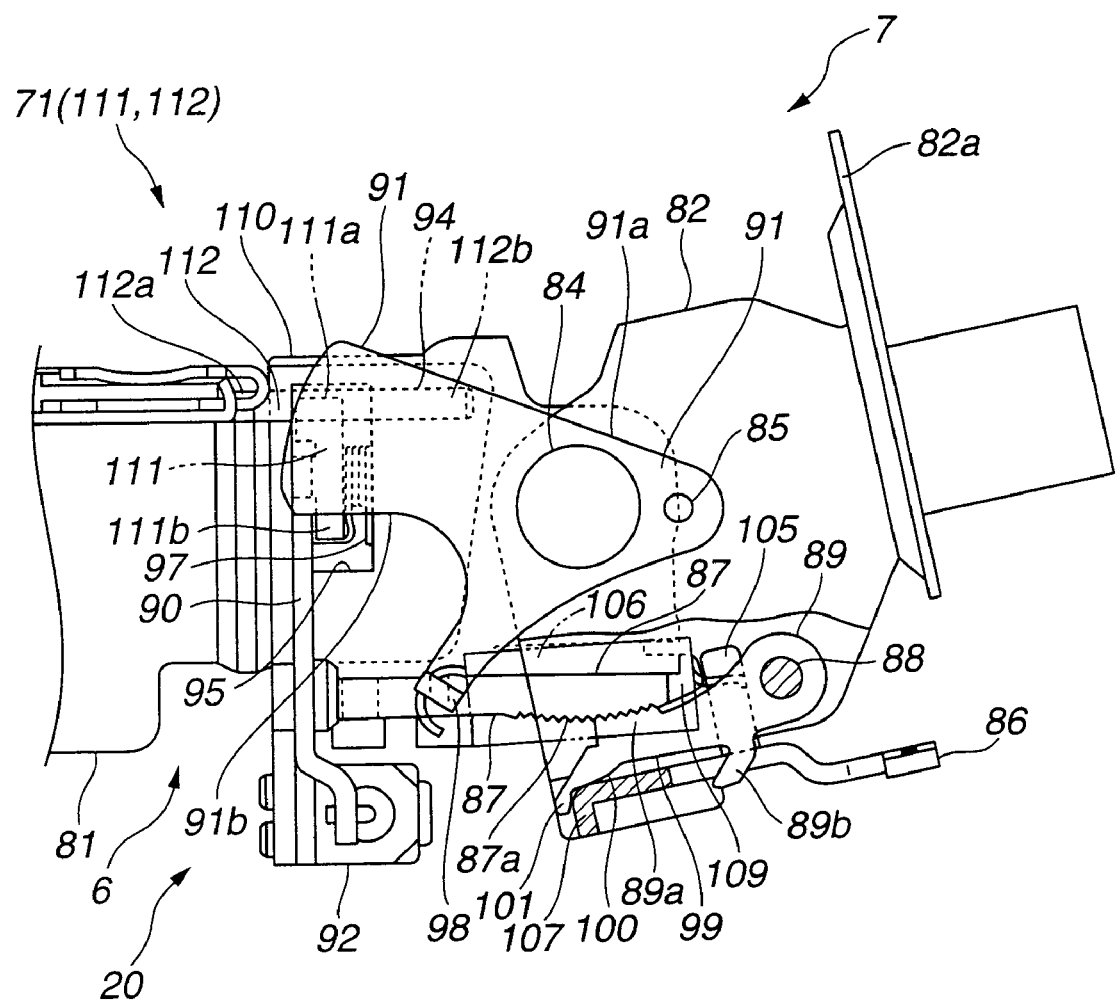
FIG. 9 is a partly broken side view of an essential part of a steering system, according to a second embodiment of the present invention.
Figure 11:
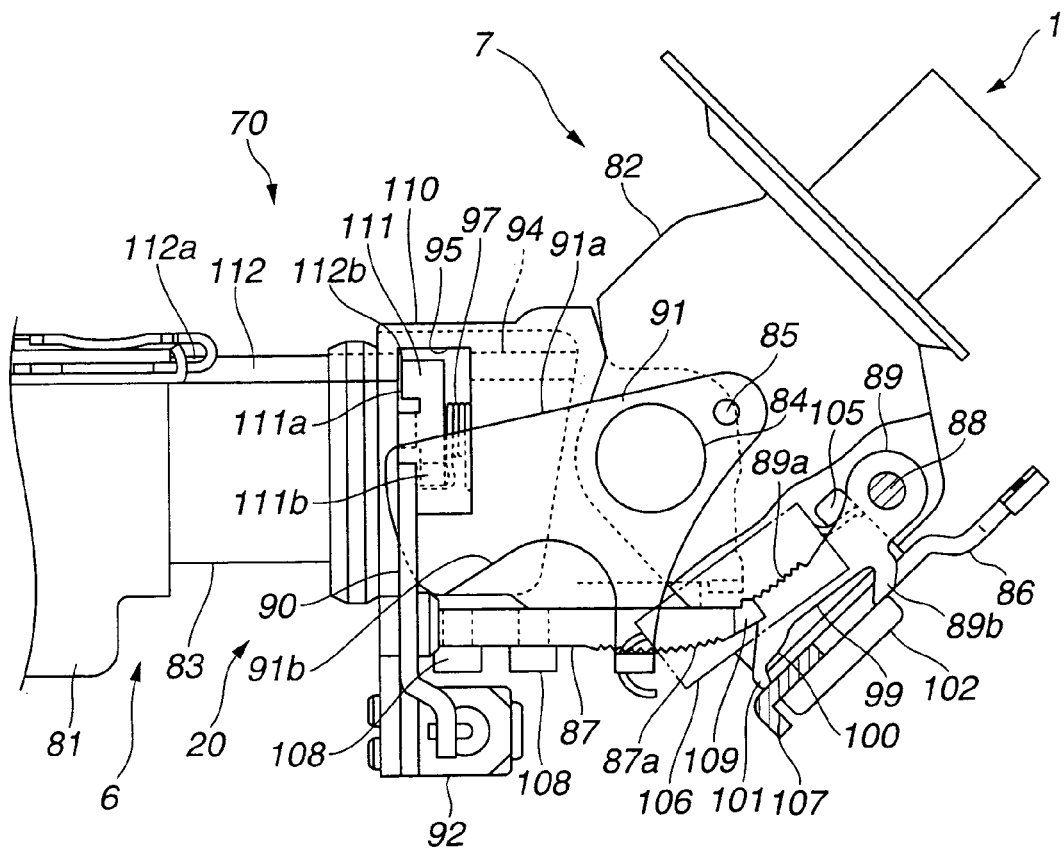
FIG. 11 is substantially similar to FIG. 9 but showing the steering system in a popped up state, according to the second embodiment.

FIG. 9 and FIG. 11 show a partly broken side view of an essential part of a steering system, according to a second embodiment of the present invention.

The steering system includes a movable column portion 82 and a stationary column portion 81. The movable column portion 82 is disposed on a steering wheel's side, and is so supported via a tilt hinge shaft 84 to a hinge bracket 110 as to pivot substantially upward and downward. The hinge bracket 110 connects to a telescope jacket 83. The telescope jacket 83 is connected to the stationary column portion 81 in such a manner as to extend and shrink (telescope).

A control portion 112 fixed to the stationary column portion 81 extends with a certain length toward the hinge bracket 110 substantially in parallel to an axial line of a telescope jacket 83. The control portion 112 has a head end portion 112b (free end) inserted into a guide hole 94 which is defined substantially through the hinge bracket 110. The hinge bracket 110 is a part which is made of an aluminum die cast and the like, and has a first side face formed with a dent portion 95. The guide hole 94 is formed in such a manner as to stride over the dent potion 95.

In the dent portion 95, an engagement portion 111 is pivotally supported by a shaft 96 (see FIG. 10), and a first end portion 111a of the engagement portion 111 is continuously biased with a return spring 97 in a direction away from the guide hole 94. A second end portion 111b (to be described afterward) of the engagement portion 111 is biased in a direction for engaging with the stopper plate 91.

The first end portion 11a (upper side) of the engagement portion 111 is adapted to block the guide hole 94, while the second end portion 111b (lower side) of the engagement portion 111 so protrudes from the dent portion 95 as to engage with the stopper plate 91. The stopper plate 91 shaped substantially into an English alphabet V is pivotally supported by a tilt hinge shaft 84, and is fixed to the movable column portion 82 with a pin 85. The stopper plate 91 has an upper portion defining a lower edge 91b which engages with the second end portion 111b. The lower edge 91b having a certain width can pivot in such a manner as to block the dent portion 95. Moreover, the stopper plate 91 has a lower portion formed with a spring engaging portion 98.

Figure 10:
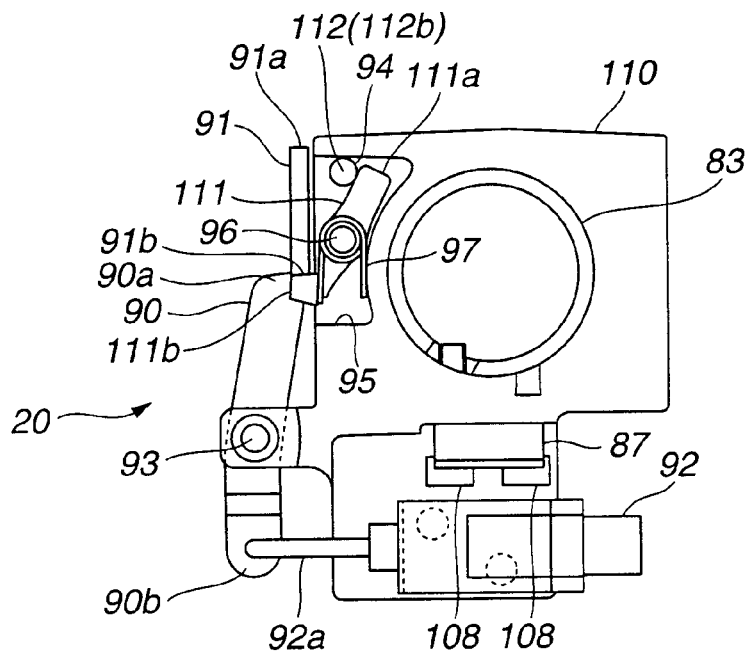
FIG. 10 is a front view of the essential part of the steering system, viewed from right side of FIG. 9, showing an electromagnetic actuator is deenergized, according to the second embodiment.
Figure 12:
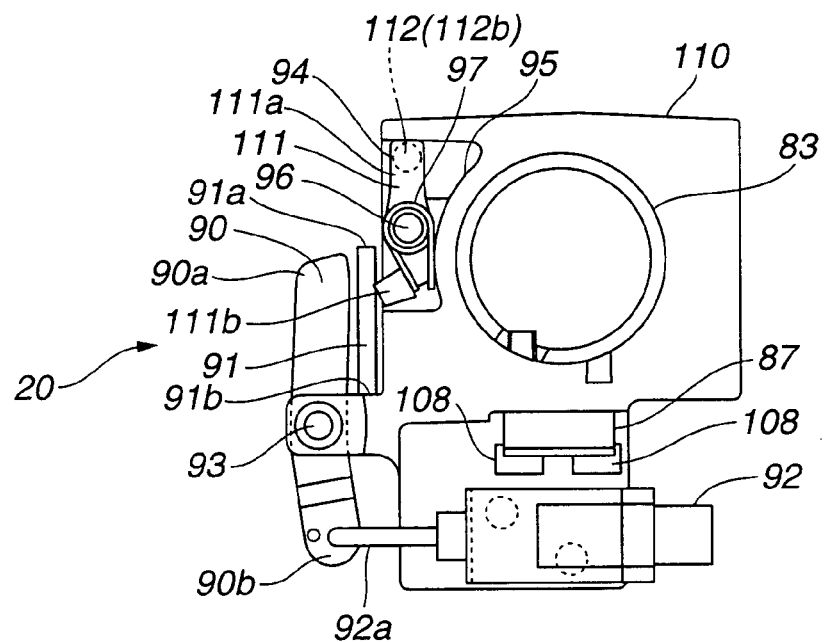
FIG. 12 is the front view of the essential part of the steering system, viewed from right side of FIG. 11, showing the electromagnetic actuator is energized, according to the second embodiment.

A lock plate 90 for stopping pivotal movement of the stopper plate 91 is pivotally supported to the hinge bracket 110 via a pivotal shaft 93. The lock plate 90 has a first end portion 90a engaging with the upper portion of the stopper plate 91, and a second end portion 90b connected to a driving shaft 92a of an electromagnetic actuator 92 which is fixed to the hinge bracket 110. The driving shaft 92a is pulled rightward as is seen in FIG. 12 when the shift lever 40 is shifted to the parking position with the electromagnetic actuator 92 energized. On the other hand, the driving shaft 92a is pressed leftward from the electromagnetic actuator 92 as is seen in FIG. 10 with the electromagnetic actuator 92 deenergized.

There is provided a movable side tooth member 89 which is pivotally (upward-downward movement) supported to a lower middle portion of the movable column portion 82 via a pivotal shaft 88. The movable side tooth member 89 has an upper face formed with a tooth portion 89a, and a lower face formed with a hook portion 89b which is inclined toward the hinge bracket 110. Moreover, the movable side tooth member 89 has a releasing face 99 and a pressing face 100 which are continuously formed. At a free end (left in FIG. 9) facing the hinge bracket 110, the movable side tooth member 89 has a pop up keeping face 101 extending diagonally downward.

Figure 13:
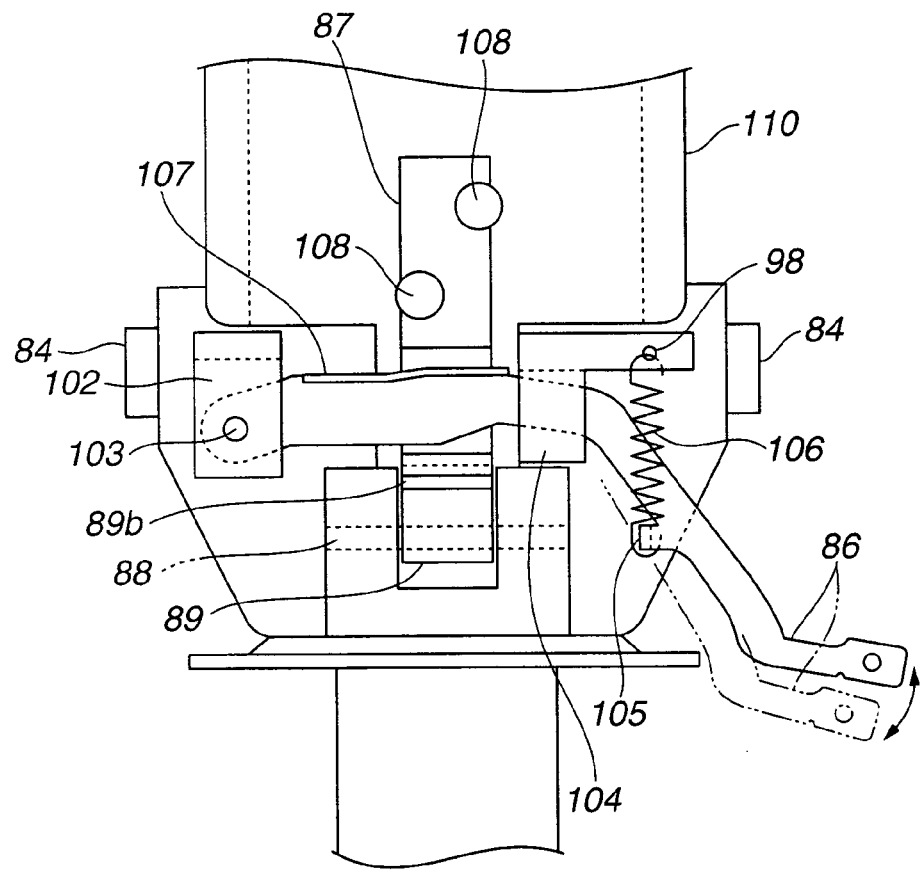
FIG. 13 is a bottom view of the essential part of the steering system, according to the second embodiment.

As is seen in FIG. 13, there is provided a tilt lever 86 for tilting the movable side tooth member 89. The tilt lever 86 is supported via a pivotal shaft 103 to a supporter 102 which is formed integrally with a lower side of the movable column portion 82. The tilt lever 86 is pivotal substantially horizontally. In a position sandwiched between the supporter 102 and the movable side tooth member 89, a guide portion 104 is formed integrally with the lower side of the movable column portion 82. Substantially a middle portion of the tilt lever 86 is so supported by the guide portion 104 as to slide substantially horizontally. Herein, there is provided a coil spring 106 which is resiliently fitted between a spring engagement portion 105 (of the tilt lever 86) and the spring engagement portion 98 (see FIG. 9). With the coil spring 106, the tilt lever 86 is pivotally biased toward the hinge bracket 110 continuously.

The tilt lever 86 has a sliding face 107 bent downward (see FIG. 9) substantially into an English alphabet L. The sliding face 107 may abut on the pressing face 100 (see FIG. 9), thus allowing a tooth portion 87a of a stationary side tooth member 87 to engage with the tooth portion 89a of the movable side tooth member 89, which engagement state is kept by a biasing force of the coil spring 106.

With the movable column portion 82 in the pop up position as is seen in FIG. 11, the sliding face 107 of the tilt lever 86 may abut on the pop up keeping face 101 which is formed continuously with the pressing face 100. With this, the movable side tooth member 89 may be pivoted and be deflected more toward the tilt hinge shaft 84 than a position for engaging the tooth portion 87a (of the stationary side tooth member 87) with the tooth portion 89a.

The hook portion 89b is used for disengaging the tooth portion 87a (of the stationary side tooth member 87) from the tooth portion 89a (of the movable side tooth member 89), and for unlocking locked popping up. In these cases, the tilt lever 86 abutting on the hook portion 89b may encourage the pivotal movement of the movable side tooth member 89 in the direction for the disengaging and unlocking.

The stationary side tooth member 87 is fixed to the hinge bracket 110 via a bolt 108. The stationary side tooth member 87 is formed with the tooth portion 87a shaped substantially into a saw tooth which is formed into an arc having a certain radius around the tilt hinge shaft 84. The tooth portion 87a can mesh with the tooth portion 89a of the movable side tooth member 89. The stationary side tooth member 87 has a free end (right in FIG. 9 and FIG. 11) which is fitted with a stopper 109 made of cushioning material including rubber and the like.

Hereinafter described is operation of the steering system, according to the second embodiment of the present invention.

FIG. 9 shows a state of the steering system with a certain tilt setting, namely, when the vehicle is drivable with the shift lever 40 in the position other than the parking. With the electromagnetic actuator 92 not operated, the driving shaft 92a is pushed out by means of a spring in the electromagnetic actuator 92. The first end portion 90a of the lock plate 90 is pivoted in such a manner as to be disposed below a track of an upper end of the hinge bracket 110.

From this state, operating the tilt lever 86 in the direction of disengagement (see virtual line in FIG. 13) may disengage the tooth portion 89a from the tooth portion 87a. A spring (not shown in FIG. 9 to FIG. 13, but substantially equivalent to the spiral spring 18 in FIG. 1 according to the first embodiment) may bias the movable column portion 82 such that the movable column portion 82 can pivot upward around the tilt hinge shaft 84, with the lower edge 91b of the upper portion of the stopper plate 91 engaged with the first end portion 90a of the lock plate 90, thus stopping pivotal movement of the lock plate 90. This stop position substantially coincides with an upper end of a certain angle range for tilt adjustment of the movable column portion 82.

In this state, the movable column portion 82, thereby, can be prevented from pivoting to the popping up angle that is greater than the certain angle range for the tilt adjustment.

Moreover, in this state, the engagement portion 111 biased by the return spring 97 allows the first end portion 111a to be deviated from the guide hole 94. In other words, the first end portion 111a is deviated from a track of the control portion 112. With this, the head end portion 112b (free end) of the control portion 112 can be inserted into the guide hole 94. Operating a telescope lever (not shown in FIG. 9 or FIG. 11, but substantially equivalent to the telescope lever 67 in FIG. 1 according to the first embodiment) in the direction of unlocking may allow the telescope jacket 83 to extend or shrink relative to the stationary column portion 81 in a certain telescope adjustment range.

For popping up the movable column portion 82, shifting the shift lever 40 to the parking position may allow the electromagnetic actuator 92 to pull the driving shaft 92a, thus allowing the first end portion 90a of the lock plate 90 to be pivoted in such a manner as to be spaced apart from the first side face (left in FIG. 12) of the hinge bracket 110, leaving a space (for the stopper plate 91) between the first end portion 90a of the lock plate 90 and the hinge bracket 110.

In this state, the second end portion 111b of the engagement portion 111 continuously biased by the return spring 97 is protruding from the hinge bracket 110 below the first end portion 90a of the lock plate 90, leaving the guide hole 94 unblocked with the first end portion 111a.

Hereinabove, the telescope jacket 83 more shrunk than a certain position relative to the stationary column portion 81, as is seen in FIG. 9, may allow the control portion 112 to be inserted into the guide hole 94 passing by a side portion of the first end portion 111a of the engagement portion 111. In this state, operating the tilt lever 86 for releasing the tooth portion 89a from the tooth portion 87a may cause the stopper plate 91 to be likely to pivot around the tilt hinge shaft 84 without engaging with the first end portion 90a of the lock plate 90. In this case, however, the lower edge 91b of the stopper plate 91 is engaged with the second end portion 111b of the engagement portion 111, and therefore, the engagement portion 111 pressed by the stopper plate 91 is likely to be pivoted around the shaft 96. The first end portion 11a of the engagement portion 111 engaging with a side face of the control portion 112, however, may prevent the above likely pivotal movement of the engagement portion 111.

The thus prevented position of the engagement portion 111 substantially coincides with the certain angle range for the tilt adjustment of the movable column portion 82.

In this state, the movable column portion 82, thereby, can be prevented from pivoting to the popping up angle that is greater than the certain angle range for the tilt adjustment.

Hereinafter described is a state of the telescope jacket 83 pulled out from the certain position such that the hinge bracket 110 and the movable column portion 82 are positioned closer to the seat occupant of the vehicle, as is seen in FIG. 11.

The control portion 112 is pulled out of the guide hole 94 of the hinge bracket 110, with the head end portion 112b (free end) removed from a position for engagement with the first end portion 111a of the engagement portion 111. In this state, the engagement portion 111 is continuously biased clockwise in FIG. 10 by means of the return spring 97. Therefore, the first end portion 11a of the engagement portion 111 can keep the position deviated from the track of the control portion 112, leaving the guide hole 94 unblocked with the first end portion 111a.

Then, pulling the tilt lever 86 against the coil spring 106 toward the hook portion 89b may turn the tilt lever 86 around the pivotal shaft 103, as is indicated by the virtual line in FIG. 13. The sliding face 107 of the tilt lever 86 may move from the pressing face 100 to the releasing face 99 of the movable side tooth member 89, with a side portion (opposite to the sliding face 107) of the tilt lever 86 abutting on the hook portion 89b, thus pivoting downward the movable side tooth member 89 around the pivotal shaft 88. With this, the tooth portion 89a of the movable side tooth member 89 may be disengaged from the tooth portion 87a of the stationary side tooth member 87.

Thereby, the movable column portion 82 is made capable of pivoting upward around the tilt hinge shaft 84. In this state, a biasing member (not shown) including a coil spring and the like disposed between the movable column portion 82 and the hinge bracket 110 may pivot the movable column portion 82 upward soon after the tooth portion 89a is disengaged from the tooth portion 87a.

At this point in time, the stopper plate 91 keeps engaged with the second end portion 111b of the engagement portion 111. With the first end portion 111a of the engagement portion 111 not engaged with the control portion 112, however, the engagement portion 111 can be made pivotable. The engagement portion 111 pushed by the stopper plate 91 may pivot counterclockwise around the shaft 96 against the return spring 97, as is seen in FIG. 12, thus removing the second end portion 111b of the engagement portion 111 from the position for engagement with the stopper plate 91.

As a result, the movable column portion 82 may, as is seen in FIG. 11, pivot to the popping up angle that is greater than the certain angle range for the tilt adjustment. The first end portion 111a of the engagement portion 111 may move to the track of the control portion 112 for blocking the guide hole 94.

On the other hand, releasing the tilt lever 86 may allow the coil spring 106 to move the sliding face 107 (of the tilt lever 86) from the pressing face 100 to the pop up keeping face 101 so as to press the pop up keeping face 101. The movable side tooth member 89 may pivot around the pivotal shaft 88 toward the tilt hinge shaft 84, with an end face of the tooth portion 89a (of the movable side tooth member 89) facing the stopper 109 of the stationary side tooth member 87. With this, the sliding face 107 may slidably abut on the pop up keeping face 101 and thereby stops movement of the movable side tooth member 89, thus abutting the end face of the tooth portion 89a on the stopper 109—locked popping up.

With the movable column portion 82 thus popped up, the upper portion of the stopper plate 91 may, as is seen in FIG. 12, keep the second end portion 111b of the engagement portion 111 pushed down. With this, the engagement portion 111 may pivot against the biasing force of the return spring 97, thus blocking the guide hole 94 with the first end portion 111a. With this, the head end portion 112b (free end) of the control portion 112 is controlled (prevented) from entering the hinge bracket 110. In other words, the hinge bracket 110 cannot be moved to the stationary column portion 81—locked telescoping.

The seat occupant of the vehicle holding the steering wheel 2 for pushing it down after getting in the vehicle may cause substantially an entire part of the end face of the tooth portion 89a to abut on the stopper 109. The end face of the tooth portion 89a receiving the above pushing force of the seat occupant may prevent the movable column portion 82 from pivoting downward around the tilt hinge shaft 84, thus keeping the locked popping up.

Like the pop up sensing switch 53 (see FIG. 1) according to the first embodiment, the steering system according to the second embodiment of the present invention also includes a pop up sensing switch for sensing the popping up of the movable column portion 82. Sensing the popping up, the pop up sensing switch according to the second embodiment may operate the shift lock mechanism 21 of a shift lever device, thus preventing the shift lever 40 from moving to other speed range than the parking position, namely, preventing the vehicle from being shifted from undrivable state to drivable state.

Described hereinafter is operation for unlocking the popping up state. As is indicated by the virtual line in FIG. 13, pulling the tilt lever 86 toward the hook portion 89b may allow the side portion (opposite to the sliding face 107) of the tilt lever 86 to abut on the hook portion 89b, thus pivoting downward the movable side tooth member 89 around the pivotal shaft 88, with the tooth portion 89a moved downward for meshing with the tooth portion 87a. Then, a preferred tilt adjustment of the movable column portion 82 is to be made. Releasing the tilt lever 86 after the preferred tilt adjustment of the movable column portion 82 may allow the sliding face 107 to abut on the pressing face 100 by means of the coil spring 106, thus meshing the tooth portion 87a with the tooth portion 89a—locked tilt.

In this state, pivotal movement of the movable column portion 82 may involve pivotal movement of the stopper plate 91. Thereby, the upper portion of the stopper plate 91 may be spaced apart from the second end portion 111b of the engagement portion 111, thus pivoting the engagement portion 111 which is biased by the return spring 97. With this, the first end portion 1a of the engagement portion 111 may stop blocking the guide hole 94, thus allowing entry of the head end portion 112b (free end) of the control portion 112—releasing of the locked telescope.

Shifting the shift lever 40 from the parking position to other speed range may make the electromagnetic actuator 92 inoperable. Thereby, the spring (not shown) in the electromagnetic actuator 92 may push out the driving shaft 92a, thus pivoting the lock plate 90 with the first end portion 90a abutting on the side face of the hinge bracket 110. In this state, trying to pop up the movable column portion 82 may end up with failure since the upper portion of the stopper plate 91 abutting on the lock plate 90 may stop pivotal movement of the stopper plate 91.

Although the present invention has been described above by reference to two certain embodiments, the present invention is not limited to the two embodiments described above. Modifications and variations of the embodiment described above will occur to those skilled in the art, in light of the above teachings.

According to the first embodiment, the movable column portion 5 is popped up by means of the spiral spring 18. The present invention is, however, not limited to this. Other type of mechanical spring including a torsional spring can replace the spiral spring 18.

Moreover, the operation controller 20 according to the first embodiment uses the lock plate 22 and the stopper plate 23. Other mechanical constitution can be used for the operation controller 20.

Moreover, the constitution of the pop up mechanism controlling mechanism 70 according to the first embodiment is not limited to the one described above. Disposition and the like of the engagement portion 71 and the control portion 72 may be varied otherwise so that the movable column portion 5 can be popped up greatly by the pop up mechanism 9 in a position other than the maximum telescope position (more specifically, a position smaller than the maximum pulled-out position).

Moreover, the P-range sensing switch 52 according to the first embodiment is an electric means having the switch and the solenoid. The P-range sensing switch 52 can be replaced by one having a mechanical constitution. More specifically about this:

The first operation member 32 pivoting in such a manner as to abut on the position pin 37 (which pin is in the P-range position) is connected to the first end of the key lock cable 38 interlocked with the key interlock mechanism (not shown). The key interlock mechanism (not shown) has such a constitution that the ignition key (not shown) cannot be removed without the shift lever 40 in the P-range, and that the shift lever 40 cannot be shifted from the P-range position without the ignition key (not shown) inserted. It is the key lock cable 38 that is used for pulling and pushing in the above constitution. In the above constitution, a second end of the key lock cable 38 comes up to a key lock unit, namely, in the vicinity of the steering column 1. By using the above, the second end of the key lock cable 38 may be divided, or interlocked with the lock plate 22 by using another member. With the above constitution, substantially all operations can be done mechanically, thus improving reliability and making substantially the same shift lock mechanism as the conventional one, resulting in reduction of the number of different parts and reduction of production cost.

Moreover, according to the first embodiment, with the shift lever 40 in the P-range, energizing the electromagnetic actuator 24 may cause heat, durability failure and the like. A switch 55 (see broken line in FIG. 8) for sensing operation of the tilt lever 11 can be used in such a manner as to energize the electromagnetic actuator 24 only when the tilt lever 11 is operated.

According to the second embodiment: When the pop up sensing switch (not shown) is sensing the popping up, the electromagnetic actuator 92 can be made inoperable, thereby shortening operation time of the electromagnetic actuator 92, resulting in improved durability.

This application is based on a prior Japanese Patent Application No. P2002-278455 (filed on Sep. 25, 2002 in Japan), and a prior Japanese Patent Application No. P2003-115155 (filed on Apr. 21, 2003 in Japan). The entire contents of the Japanese Patent Application No. P2002-278455 from which priority is claimed and the entire contents of the Japanese Patent Application No. P2003-115155 are incorporated herein by reference, in order to take some protection against mis-translation or omitted portions.

The scope of the present invention is defined with reference to the following claims.

What is claimed is:

1. A steering system for a vehicle, a steering column of the steering system being separated in a certain axial position into a stationary column portion on a steering gear side and a movable column portion on a steering wheel side opposite to the steering gear side, the steering system comprising:
   1) a tilt mechanism including a pivotal shaft which is disposed at a portion between the stationary column portion and the movable column portion and extends in a sidewise direction of the vehicle, the tilt mechanism being adapted to pivot the movable column portion upward and downward around the pivotal shaft, the tilt mechanism controlling the movable column portion to be secured in a certain upper pivotal position and a certain lower pivotal position for a driving of the vehicle;
   2) a telescope mechanism adapted to pull out and push in in a forward-backward direction of the vehicle the movable column portion including the pivotal shaft;
   3) a pop up mechanism for allowing the movable column portion to make a popping up over an uppermost pivotal position defined by the tilt mechanism; and
   4) a pop up mechanism controlling mechanism for controlling the popping up of the movable column portion by the pop up mechanism until the movable column portion pulled out by the telescope mechanism has a certain length.

2. The steering system as claimed in claim 1, wherein the pop up mechanism includes:
   1) a biasing member for biasing the movable column portion in a direction of the popping up,
   2) a tilt lever for controlling and releasing a tilting of the movable column portion, the tilting being caused by the tilt mechanism,
   3) a stop state sensing means for sensing a stop state of the vehicle, and
   4) an operation controller for mechanically controlling, based on a result given by the stop state sensing means, the popping up of the movable column portion, and
   the operation controller allows the popping up of the movable column portion in the following states:
   1) the stop state sensing means senses the stop state of the vehicle, and 2) the movable column portion is pulled out by the telescope mechanism to such an extent as to have the certain length in the backward direction of the vehicle.

3. The steering system as claimed in claim 2, wherein the stop state sensing means is a P-range sensing means of a shift lever of an automatic transmission of the vehicle, the alphabetical P of the P-range standing for parking.

4. The steering system as claimed in claim 3, wherein the steering system further comprises:
   1) a pop up sensing switch for sensing the movable column portion that is in a state of being popped up over a certain angle range, and
   2) a shift lock mechanism for locking, based on an operation of the pop-up sensing switch, the shift lever from shifting from the P-range to another speed range.

5. The steering system as claimed in claim 3, wherein the operation controller includes:
   1) a lock plate disposed on a first side of the steering column in such a manner as to make a pivotal movement,
   2) an operation member fixed to the movable column portion, the operation member being adapted to be disengaged from the lock plate for allowing a pivotal upper movement of the movable column portion and to be engaged with the lock plate for controlling the pivotal upper movement of the movable column portion, in accordance with the pivotal movement of the lock plate, and
   3) an actuator for engaging the lock plate with the operation member and disengaging the lock plate from the operation member, by controlling a pivotal position of the lock plate based on a sensing signal from the P-range sensing means, and
   turning on the P-range sensing means so energizes the actuator as to disengage the lock plate from the operation member, thus making the movable column portion pivotable upward.

6. The steering system as claimed in claim 5, wherein the pop up mechanism controlling mechanism includes:
   1) an engagement portion disposed at a first end portion of the lock plate, and
   2) a control portion disposed on the stationary column portion and extending in the forward-backward direction of the vehicle, and
   until the movable column portion pulled out by the telescope mechanism has the certain length or over, the control portion mechanically engages with the engagement portion in such a manner as to keep engaging the lock plate with the operation member.

7. The steering system as claimed in claim 6, wherein when the movable column portion is in a state of making the popping up, a first end portion of the engagement portion blocks a guide hole defined through a hinge bracket which is mounted to a free end portion of a telescope jacket telescopically mounted to the stationary column portion, thus preventing a head end portion of the control portion from entering the guide hole.

8. The steering system as claimed in claim 5, wherein the operation member is a stopper plate.

9. The steering system as claimed in claim 1, wherein the pivotal shaft is a tilt hinge shaft.

10. A steering system, a telescope jacket being telescopically mounted to a stationary column portion, a hinge bracket being mounted to a free end portion of the telescope jacket, a movable column portion being pivotally mounted to the hinge bracket via a pivotal shaft, the telescope jacket in a telescopic position thereof in an axial direction being adjustable relative to the stationary column portion, the movable column portion in an angular position thereof in an upward-downward direction being adjustable relative to the hinge bracket, a lock mechanism being provided for a locking operation and an unlocking operation in the telescopic position and the angular position, the movable column portion being adapted to make a popping up over a certain angle range for a tilting, the steering system comprising:
   1) a control portion defining a track, comprising:
      i) a base end portion fixed to the stationary column portion, and
      ii) a head end portion which is a free end portion extending in parallel to the telescope jacket,
   2) a stopper plate fixed to the movable column portion, the stopper plate being pivotal around a pivotal shaft integrally with the movable column portion, the stopper plate defining a track, and
   3) an engagement portion pivotally supported to the hinge bracket, the engagement portion being biased to a direction for engaging with the stopper plate, the engagement portion including a first end portion and a second end portion,
      with the second end portion on the track defined by the stopper plate, the first end portion being away from the track defined by the control portion,
      with the second end portion away from the track defined by the stopper plate, the first end portion being on the track defined by the control portion,
      with the telescope jacket in a position for becoming shorter than a certain length thereof, the control portion abutting on the first end portion of the engagement portion, thus stopping the second end portion of the engagement portion from being away from the track defined by the stopper plate, and
      with the movable column portion in a position for making the popping up, the stopper plate abutting on the second end portion of the engagement portion, thus preventing the first end portion of the engagement portion from being away from the track defined by the control portion.

11. The steering system as claimed in claim 10, wherein the steering system further comprises a lock plate pivotally supported to the hinge bracket, the lock plate including a first end portion which is biased in a direction for engaging with the stopper plate, the lock plate including a second end portion which connects to an electromagnetic actuator, the electromagnetic actuator being operable when sensing that a vehicle is not driving, and
the electromagnetic actuator sensing that the vehicle is not driving allows the lock plate to pivot in such a manner as to be disengaged from an engagement position of the stopper plate.

12. The steering system as claimed in claim 10, wherein when the movable column portion is in a state of making the popping up, the first end portion of the engagement portion blocks a guide hole defined through the hinge bracket, thus preventing the head end portion of the control portion from entering the guide hole.

13. The steering system as claimed in claim 10, wherein the pivotal shaft is a tilt hinge shaft.

* * * * *